Sept. 26, 1950     R. T. PLACE     2,523,542
REGULATOR VALVE
Filed July 17, 1946
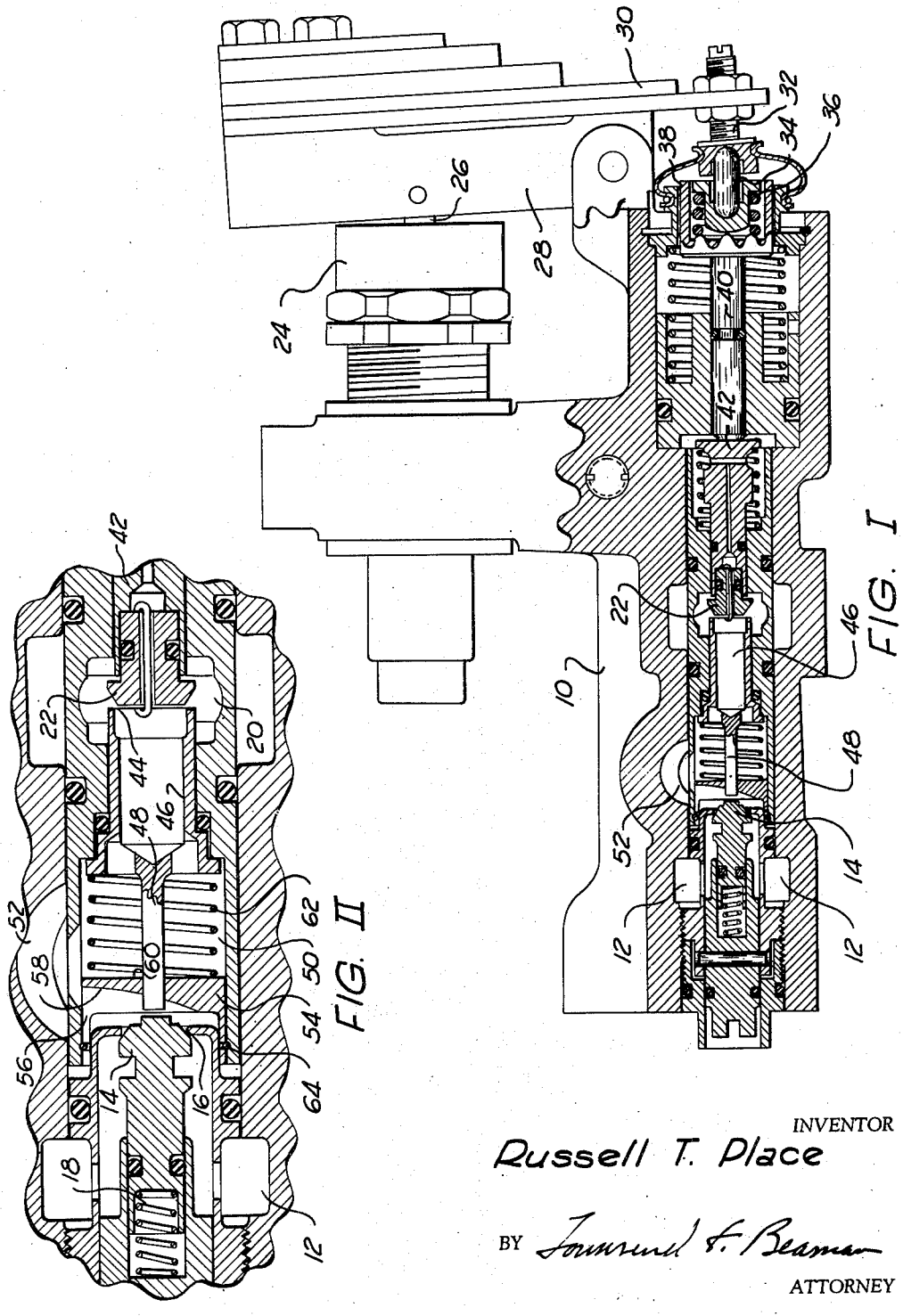
INVENTOR
Russell T. Place
BY Townsend F. Beaman
ATTORNEY Patented Sept. 26, 1950

2,523,542

UNITED STATES PATENT OFFICE 2,523,542

REGULATOR VALVE

Russell T. Place, Detroit, Mich., assignor, by mesne assignments, to The B. F. Goodrich Company, Akron, Ohio, a corporation of New York Application July 17, 1946, Serial No. 684,369

3 Claims. (Cl. 303—54)

The present invention relates to improvements in regulating valves for brakes of the type described in co-pending application Serial No. 545,638, filed July 19, 1944, now abandoned.

It is an object of the present invention to improve the operation of the valve of the type shown in the aforesaid application through the provision of jet means located on the "to brakes" side of the valve part which regulates the flow of pressure between the pressure accumulator and the brakes.

Another object is to provide a brake valve of the type described having a jet discharge into the "to brakes" hydraulic connection to accelerate the initial flow of fluid pressure to the brakes.

Another object is to provide a fluid regulating valve so constructed as to reduce flow losses to effect high initial acceleration of fluid pressure.

These and other objects and advantages residing in the combination, arrangement and construction of the component parts of the valve will be more apparent from a consideration of the following specification and the appended claims.

In the drawings,

Fig. I is a side elevational view of a regulating valve embodying the present invention and partly shown in section, and Fig. II is an enlarged fragmentary cross-sectional view of the valve structure shown in Fig. I.

Referring to the accompanying drawings, the regulating valve 10 includes an inlet chamber 12 in fluid communication with a source of fluid pressure, as for example, a pressure accumulator of the type used in aircraft.

The inlet valve part 14 regulates the inlet port 16. A spring 18 holds the valve part 14 to its seat. The flow of return fluid into the return chamber 20 is controlled by valve part 22 having movement imparted thereto by the pedal actuated master cylinder in fluid connection with the cylinder 24 and mechanically connected to the valve part 22 through parts 26, 28, 30, 32, 34, 36, 38, 40 and 42.

Movement of the valve part 22 to the left to apply the brakes will close return ports 44 of the tubular valve part 46 and brings the pin 48 into engagement with the inlet valve 14 to open the inlet port 16.

With the opening of the inlet valve part 14, high pressure fluid from the accumulator flows through the port 16 into the chamber 50 and out through the passage 52 leading to the conduit connected to the brakes. To improve high initial acceleration through the valve 10 to the brakes, a relatively unobstructed jet is provided between the port 16 and the passage 52 by slotting the cylindrical member 54 at 56 with the bottom of the slot 56 arcuate and inclined from the port 16 toward the passage 52. The face 60 of the member 54 serves as a seat for the spring 62, the thrust of which is resisted by the snap ring 64.

In practice, when the inlet valve part 14 is cracked from its seat with the port 16, fluid under high pressure is directed with jet-like action toward the passage 52 through the slot 56 to provide high initial acceleration of fluid through the valve 10. Comparative tests to determine time lag establish improved performance with the use of the jet member 54 over discharging directly into the chamber 50 in a manner similar to that shown in the aforesaid application.

Having thus described my invention, what I claim as new and desire to cover by Letters Patent is:

1. In a hydraulic brake regulating valve characterized by high initial acceleration of fluid, a body structure having located along an axis thereof in succession a pressure supply chamber with a normally closed pressure fluid outlet, a delivery chamber adapted to be continuously connected to the brake, a fluid return chamber, an axially movable inlet valve between said supply and delivery chambers normally closing said outlet, a normally open return valve between said delivery and fluid return chambers, valve actuator means movable axially of said body for closing said return valve and opening said inlet valve in sequence, a lateral passage for conducting fluid from said supply chamber and adapted for connection to the brake, and a baffle means defining a flow passage and adapted to direct the entire flow of fluid from the said inlet valve to said lateral passage.

2. In a hydraulic brake regulating valve characterized by high initial acceleration of fluid, a body structure having located along an axis thereof in succession a pressure supply chamber with a normally closed pressure fluid outlet, a delivery chamber adapted to be continuously connected to the brake, a fluid return chamber, an axially movable inlet valve between said supply and delivery chambers normally closing said outlet, a normally open return valve between said delivery and fluid return chambers, valve actuator means movable axially of said body for closing said return valve and opening said inlet valve in sequence, a lateral passage for conducting fluid from said supply chamber and adapted for connection to the brake, and baffle means defining a flow passage in said delivery chamber and adapted to divert the entire fluid flow from the said inlet valve to said lateral passage, said valve actuator means extending through said inclined baffle means.

3. In a hydraulic brake regulating valve characterized by high initial acceleration of fluid, a body structure having located along an axis thereof in succession a pressure supply chamber with a normally closed pressure fluid outlet, a delivery chamber adapted to be continuously connected to the brake, a fluid return chamber, an axially movable inlet valve between said supply and delivery chambers normally closing said outlet, a normally open return valve between said delivery and fluid return chambers, valve actuator means movable axially of said body for closing said return valve and opening said inlet valve in sequence, a lateral passage for conducting fluid from said supply chamber and adapted for connection to the brake, and a baffle means defining a flow passage in said delivery chamber and adapted to divert the entire fluid flow from the said inlet valve to said lateral passage, said baffle means extending entirely across said delivery chamber and having an axially extending aperture and said valve actuator means extending through said aperture.

RUSSELL T. PLACE.

REFERENCES CITED

The following references are of record in the file of this patent:

UNITED STATES PATENTS

| Number | Name | Date |
| --- | --- | --- |
| 2,397,234 | Blake | Mar. 26, 1946 |